(No Model.)
T. A. EDISON.
CURRENT REGULATOR FOR DYNAMO ELECTRIC MACHINES.
No. 248,421. Patented Oct. 18, 1881.
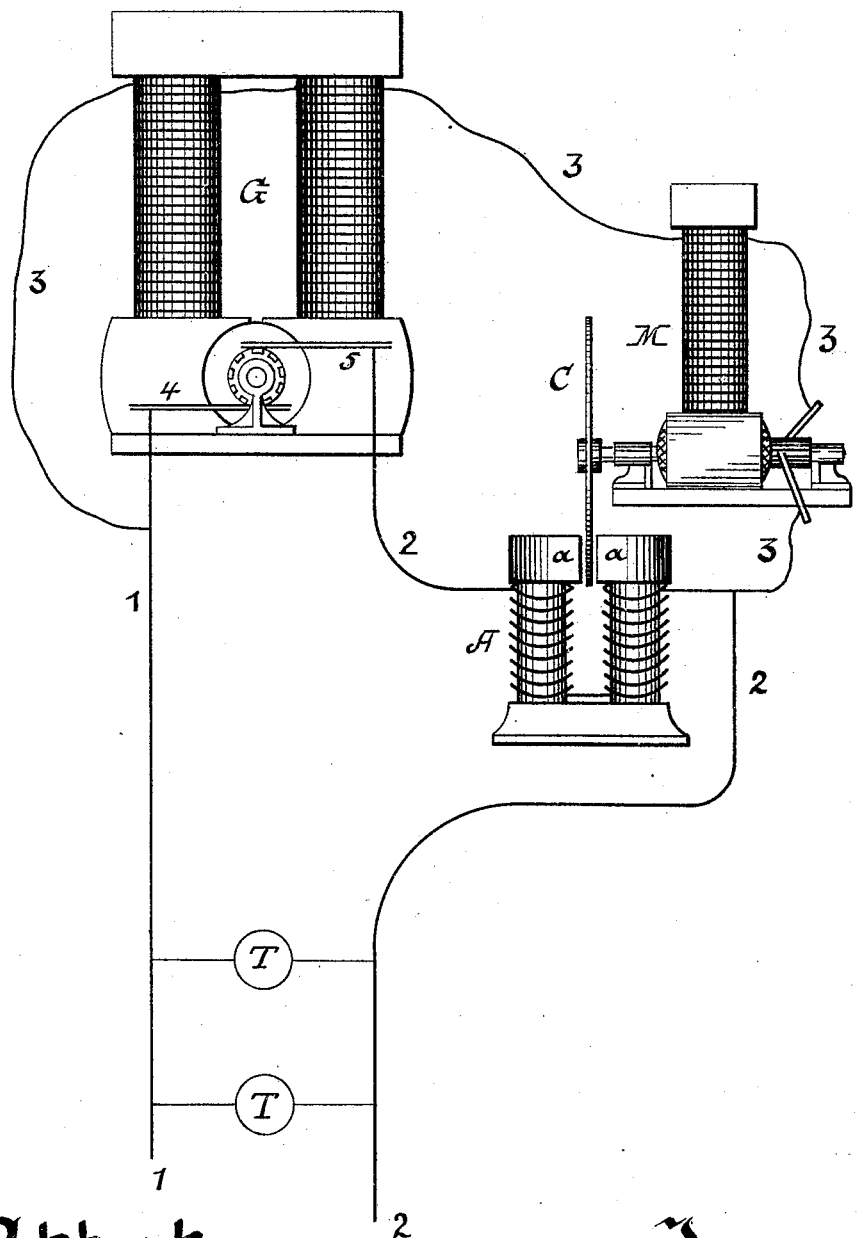
Attest:
O. D. Mott
M. J. Clagett
per
Inventor
T. A. Edison
Dyer & Wilber
Attys.

United States Patent Office.

THOMAS A. EDISON, OF MENLO PARK, NEW JERSEY, ASSIGNOR TO THE EDISON ELECTRIC LIGHT COMPANY, OF NEW YORK, N. Y.

CURRENT-REGULATOR FOR DYNAMO-ELECTRIC MACHINES.

SPECIFICATION forming part of Letters Patent No. 248,421, dated October 18, 1881.

Application filed March 5, 1881. (No model.)

*To all whom it may concern:*

Be it known that I, THOMAS A. EDISON, of Menlo Park, in the county of Middlesex and State of New Jersey, have invented a new and useful Improvement in Current-Regulators for Dynamo-Electric Machines; and I do hereby declare that the following is a full and exact description of the same, reference being had to the accompanying drawing, and to the letters of reference marked thereon.

In a system for supplying electricity from one source for a number of translating devices it is desirable that there be such an arrangement as will insure the generation of the proper amount of current, no matter how many devices be in circuit, so that the proper amount be supplied to each such device in circuit without regard to the increase or decrease of the total number in circuit, and the proper pressure or electro-motive force be maintained constant in the circuit.

The object of this invention is to attain such a result. In prior applications it has been shown how this object may be accomplished by varying the current energizing the field-of-force magnets, either by shunting more or less of such current or by interposing in the field-circuit more or less resistance.

I have discovered another method, which consists in causing a greater or less electro-motive force from a magneto-machine used as an engine to traverse the field-circuit of the generator, the counter electro-motive force having the function of a resistance. This method may be put into practice in the following way: An electro-motor of small or proportionately much less resistance and power than the generator is included in the circuit of the field-of-force magnets of the generator. Upon the shaft of the revolving armature of the electro-motor is mounted a copper disk, which rotates between the polar extensions of an electro-magnet included in the field-circuit, and also in the circuit leading to the translating devices to be supplied, which are arranged upon multiple-arc circuits. This electro-magnet is wound with coarse wire, so as to have but little resistance. When no translating devices are in circuit, the exterior circuit of the generator is only through the motor-engine and the magnet, and there is but little current therein, energizing but feebly the magnet, so that it offers little resistance to the rotation of the disk cutting the lines of forces between its polar extensions. This feeble retardation allows the engine to run at high speed, giving a counter electro motive in the field-circuit, weakening the energizing-current. If, now, the circuit of translating devices be closed, so that the exterior circuit of the generator is through them, the resistance of the exterior circuit is decreased, causing a greater flow of current therethrough, which intensifies the magnetization of the magnet referred to, which now offers increased resistance to the rotation through its lines of force of the disk, causing the electro-motor to run at a less rate, diminishing the counter electro-motive force in the field-circuit, thereby strengthening the field, with the necessary resultant of increased generation. Upon devices being cut out of circuit, the reverse takes place. This is illustrated in the drawing, in which G is the generator, and 1 2 the conductors leading thence for the supply of translating devices, (represented by T T.) While only one generator and two translating devices are indicated, it is evident that any number may be used. As shown, G is a dynamo-electric machine, whose field-circuit 3 passes as a derived circuit from the commutator brushes or springs 4 5 around the field, and includes an electric motor, M, and a magnet, A, the latter being also included in one branch, 2, of the exterior or supply circuit.

Upon the shaft of M is a copper disk, C, which rotates between the polar extensions *a a* of magnet A, its rotation being opposed by the magnetic field between *a* and *a*, whose lines of force it is obliged to cut, and opposed proportionately to the strength of that magnetic field. If, now, no translating devices be in circuit, the entire resistance of the exterior circuit of the generator is only that of A and M, which is comparatively large. Consequently A has but a weak magnetization, offering but little resistance to the rotation of C, allowing the motor M to run at high speed, the result being that considerable counter electro-motive force therefrom is thrown into the field circuit of the generator. If, now, translating devices T be put in circuit, the resistance of the external circuit is decreased, resulting in greater flow of current in the exterior circuit, a stronger megnetization of A, and a retardation of C, slowing the rate of the motor M, and diminishing the counter electro-motive force thrown therefrom into the field-circuit, so that the field-circuit is strengthened substantially, the essential result being that aimed at—an increase in the generative capacity of the generator G and a uniform pressure or electro-motive force throughout the system.

By this arrangement the generators may be automatically controlled, so that the generation of current is kept just adequate to the demand of the supply or consumption circuit, and the pressure or electro-motive force maintained constant.

While the generator herein shown is a dynamo, it is evident that the method and means may be applied to magneto-machines, or to that class in which the field is energized from an exterior source of energy.

What I claim is—

1. The method of controlling or regulating the generative force of a dynamo or magneto electric machine consisting in throwing into the field-magnet circuit a variable and controllable counter electro-motive force, substantially as set forth.

2. The combination, with a generator, of an electro-motor included in and regulating the field-magnet circuit by its counter electro-motive force, substantially as set forth.

3. The combination of a generator, an electro-motor included in the field-magnet circuit, and a magnet in the supply or consumption circuit controlling the rate of rotation of the motor, substantially as set forth.

4. The combination, with a motor, of a disk driven thereby, and a magnet, between whose poles or in whose field the disk rotates to vary and control the rate of rotation of the motor, substantially as set forth.

5. The combination of a generator, an electro-motor in the field-magnet circuit, carrying a disk upon its rotating shaft, and a magnet in the supply-circuit in whose field the disk rotates, whereby the rate of the motor and the strength of the field-circuit are varied and controlled, substantially as set forth.

This specification signed and witnessed this 25th day of February, 1881.

THOS. A. EDISON.

Witnesses:
S. D. MOTT,
H. W. SEELY.